April 8, 1969 F. NITTEL ET AL 3,437,483

ULTRAVIOLET ABSORBING FILTERS

Filed July 21, 1964

INVENTORS:
FRITZ NITTEL, HEINZ MECKL, WALTER PÜSCHEL, HANS ULRICH.

BY

ATTORNEYS

United States Patent Office 3,437,483
Patented Apr. 8, 1969

3,437,483
ULTRAVIOLET ABSORBING FILTERS
Fritz Nittel, Cologne-Stammheim, Heinz Meckl, Cologne-Flittard, and Walter Püschel and Hans Ulrich, Leverkusen, Germany, assignors to Agfa Aktiengesellschaft, Leverkusen, Germany, a corporation of Germany
Filed July 21, 1964, Ser. No. 384,154
Claims priority, application Germany, July 31, 1963,
A 43,729
Int. Cl. G03c 1/84
U.S. Cl. 96—84             7 Claims

ABSTRACT OF THE DISCLOSURE

Color photographic layers and other materials are protected against ultraviolet light by layer of gelatin containing a compound

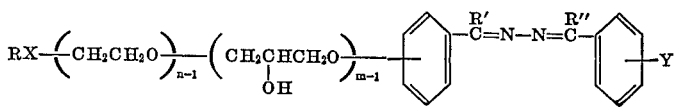

Figure 1:
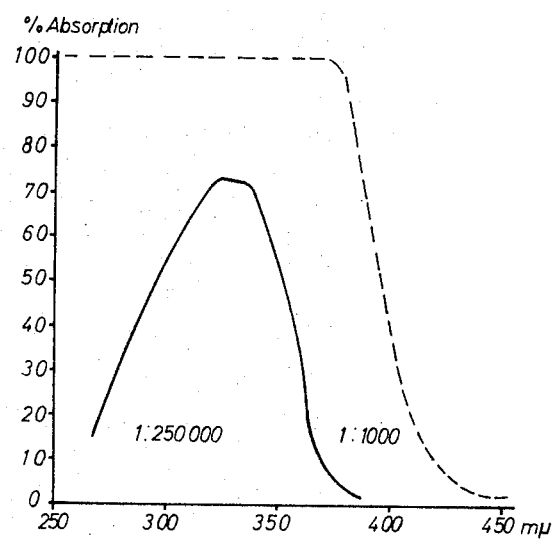
Figure 2:
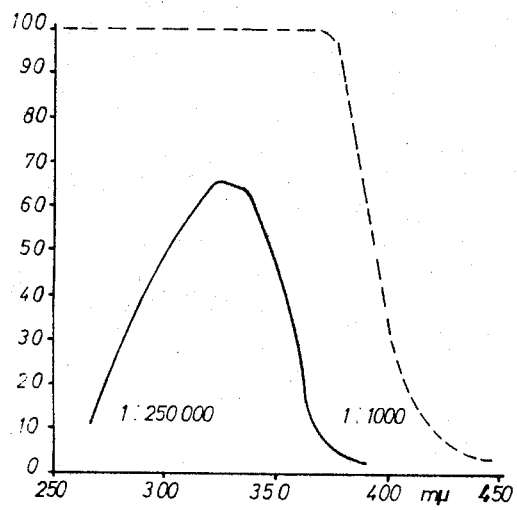
Figure 3:
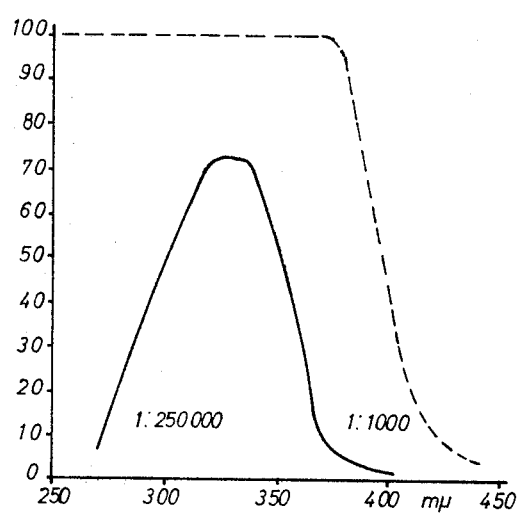

as defined below.

---

This invention relates to ultraviolet absorbing filters for protection against the harmful effect of ultraviolet radiation, in particular to photographic elements containing the ultraviolet absorbing filter.

It is known that certain materials are adversely affected by ultraviolet radiation, when such materials are exposed to daylight. In order to protect these materials against the ultraviolet radiation it is common practice to provide them with a protective coating containing an ultraviolet absorbing compound.

This is especially true in the case of color photographic images in multilayer photographic materials where the dye images formed in the light-sensitive layers by color development are susceptible to fading and discoloration by the action of ultraviolet light to which the photographic images are subjected during viewing in daylight. It is advantageous to apply the ultraviolet absorption compounds in separate layers since, if they are incorporated into the dye images containing layers, very often the opposite effect is produced, namely intensified fading of the dye images. It is common practice to apply the ultraviolet absorbing layer either on the unexposed and unprocessed photographic material or on the processed color photographic material containing the dye images. In particular if the filter layers are applied onto the unprocessed photographic element, the ultraviolet absorbing compounds have to meet certain conditions. For example, the ultraviolet absorbing compounds must not undergo any change upon color photographic processing, should have no tendency to crystallization and exudation, should have good light fastness and should also withstand the temperatures of high glaze drying without being damaged.

It is an object of the present invention to provide ultraviolet absorbing compounds which in particular absorb light of those wavelength by which the dye fading and yellowing is primarily caused. Another is to provide ultraviolet absorbing filter layers which in particular are applied onto color photographs in multilayer photographic materials. Other objects will become apparent from a consideration of the following description and examples.

We now have found that ultraviolet absorbing compounds of the following formula can be used, in particular for a filter coating on color photographs to prevent dye fading and discoloration and to overcome the aforementioned difficulties without any deleterious effect of the ultraviolet absorbing compounds itself:

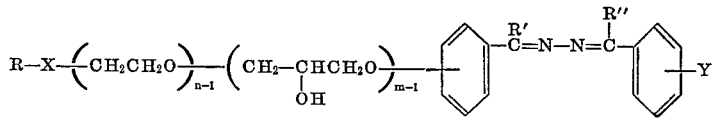

wherein:

R represents a hydrogen atom, a straight-chain or branched alkyl group with 1–20 carbon atoms, an alkenyl group having up to 20 carbon atoms with nonconjugated carbon-carbon double bonds such as allyl or oleyl, phenyl, and alkaryl such as phenyl substituted with alkyl radicals having up to 20 carbon atoms, or aralkyl such as benzyl or phenylethyl;

R' represents a hydrogen atom or alkyl, preferably lower alkyl having up to 3 carbon atoms, such as methyl or ethyl;

R" represents a hydrogen atom, alkyl, preferably lower alkyl having up to 3 carbon atoms, such as methyl or ethyl, or aryl such as phenyl or naphthyl;

X represents O, S, or

Y represents hydrogen, halogen such as chlorine or bromine, hydroxy, etherified hydroxy preferably alkoxy having up to 5 carbon atoms, sulfo, carboxyl which may be esterified preferably with lower aliphatic alcohols having up to 5 carbon atoms, or a group of the formula:

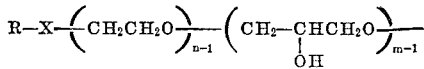

$n$ represents an integer from 1–10;
$m$ represents an integer from 1–2, at least $n$ or $m$ representing an integer larger than 1.

The use of compounds of the above aromatic azine type as ultraviolet absorbing compounds is known from British patent specification No. 591,275, but the compounds mentioned therein are of limited utility in particular if utilized in protective coatings on color photographs. The compounds described in the above specification have high melting points, a high tendency to crystallization and low solubility in the solvents used in the emulsification process in order to incorporate them into the hydrophilic colloid layers. Thus, it is hardly possible to produce ultraviolet absorbing coatings therewith.

The ultraviolet absorbing compounds to be used according to the present invention represent crystalline or waxy substances or highly viscous oils of very good solubility and excellent emulsifiability. The compounds are distinguished by high molar extinction, good light stability and a decay of absorption at the boundary of the visible spectral region (see the accompanying drawings). On account of their good emulsifiability, they can be introduced into the photographic layers in the form of emulsions without any difficulty. For the preparation of the emulsions, it is possible also to use high-boiling organic solvents, such as phosphoric acid esters or esters of polybasic carboxylic acids such as phthalic or adipic acid. The highly viscous ultraviolet absorbing compounds introduced in the form of emulsions into the photographic layers are further distinguished by the fact that they increase considerably the flexibility of the photographic gelatin layer and thus prevent these layers becoming brittle, particularly with low air humidity.

The use of the compounds is not restricted to color photographic purposes; it can also be extended to any desired other fields of use, such as plastic foils, light filters and packing materials.

The ultraviolet absorbing compounds of the present invention can be prepared by reacting γ-chloropropyleneglycol ethers or chlorinated ethylene oxides with hydroxybenzaldehyde or hydroxyphenones and condensing the resulting aldehydes or ketones with hydrazine.

The following examples will serve to illustrate the manner whereby the ultraviolet absorbing compounds can be prepared.

(Ia) γ-Chloropropylene glycolethers

These compounds are produced by reacting epichlorhydrine with alcohols to form compounds of the following formula:

RO.CH$_2$—CH.CH$_2$Cl
          |
          OH

In the above reaction it might be possible that also small amounts of the isomeric compounds of the following formula are produced:

R.OCH—CH$_2$Cl
     |
     CH$_2$
     |
     OH

The method is illustrated by the following specific example.

γ-Chloropropylene glycol-α-octylether n-C$_8$H$_{17}$—O—CH$_2$—CH—CH$_2$Cl
                    |
                    OH 500 g. of n-octanol and
5 ml. of SnCl$_4$ are heated to 80° C. and
380 g. of epichlorhydrine are added dropwise with stirring and at such a speed that the internal temperature is kept at 110° C. After completing the addition, the temperature is kept for another hour at 80° C. and then the mixture is distilled under high vacuum. 725 g. of an oil with a B.P. 0.1=110° C. are obtained.

The following γ-chloropropylene glycol-ethers are prepared in analogous manner:

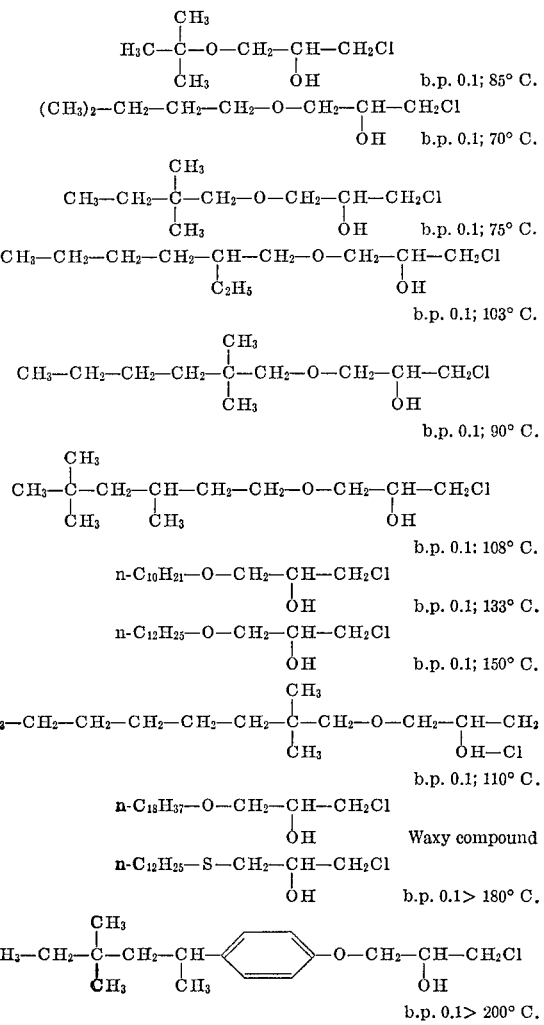

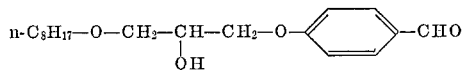

(Ib) Chlorinated ethyleneoxides and ethers thereof

Ethers of ethyleneoxides are prepared in known manner by reacting the desired alcohol with the ethyleneoxides.

The glycol ethers thus obtained are transformed by boiling with excess thionyl chloride into the chlorides CnH$_{2n+1}$—(O—CH$_2$—CH$_2$)$_x$—Cl for example the following compound C$_{12}$H$_{25}$—(O—CH$_2$—CH$_2$)$_4$—Cl (Ic) Ethyleneglycolethers of γ-chloropropyleneglycol can be prepared by reacting the polyethyleneglyol or the monoethers thereof with epichlorhydrine as described under Ia (II) Reaction of hydroxybenzaldehyde or hydroxyphenones with γ-chloropropyleneglycolethers or chlorinated ethylene glycols A suitable method is illustrated by way of the following preparation of a compound having the formula:

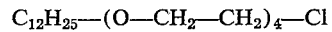

30 g. of sodium are dissolved in
400 ml. of absolute methanol,
160 g. of 4-hydroxybenzaldehyde,
300 g. of γ-chloropropylene glycol-n-octyl ether and 1 g. of NaI are added and the mixture boiled for 12 hours under reflux. The pH is adjusted to 6 with

2N—CH₃COOH the mixture treated with activated carbon then introduced into water and extracted with $CH_2Cl_2$. After removing the solvents, 350 g. of a highly viscous oil is obtained which cannot be distilled without decomposition. Yield 85%.

If the octylether is replaced by the corresponding octadecylether, the following compound with a melting point of 71° C. is obtained:

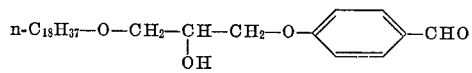

Other aldehydes of the above type are obtained in analogous reactions.

Hydroxyphenones, for example the 4-hydroxyacetophenone are reacted under similar conditions to form ketones of the following general formula:

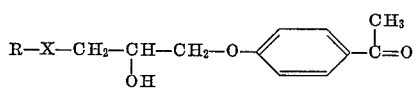

Polyglycol derivates are obtained accordingly.

(III) Ultraviolet absorbing azine compounds

The aldehydes or ketones prepared as described under II can be reacted without further purification with hydrazine to form the ultraviolet absorbing compounds of the present invention.

(A) Symmetrical azines

The preparation of the compounds is shown by the following specific example:

100 g. of the following compound:

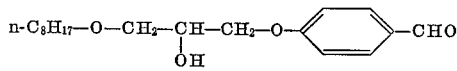

and 4 g. of hydrazine hydrate are refluxed for 1 hour in 100 ml. of ethyl alcohol, 2 ml. of glacial acetic acid and 0.5 ml. of a 10% aqueous sodium acetate solution. After adding another 4 g. of hydrazine hydrate, heating is continued for another 30 minutes, the mixture is then introduced into water, suction-filtered and recrystallized from methanol.

Yield of Compound 4 (as listed below) is 75% (75 g.).

Azines which carry branched fatty acid radicals are usually obtained in the form of highly viscous oils. In these cases, the procedure is modified as follows: after completing the reaction, the reaction mixture is treated with activated carbon or bleaching earth, introduced into water, extracted with $CH_2Cl_2$ and the solvent is distilled off. In this way, the substances are obtained in a sufficiently pure form. Their characterisation is effected by their infrared and ultraviolet spectra (λ max.: 330 mμ).

Suitable compounds are, for example:

(1)

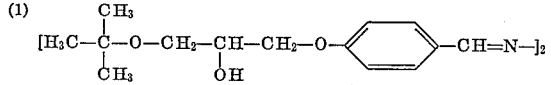

light yellow crystals M.P. 210° C.

(2)

$$\left[\begin{array}{c}CH_3\\ \diagdown\\ CH-CH_2-CH_2-O-CH_2-CH-CH_2-O-\langle\!\!\langle\ \ \rangle\!\!\rangle-CH=N-\\ \diagup\quad\quad\quad\quad\quad\quad\quad\quad|\\ CH_2\quad\quad\quad\quad\quad\quad\quad\quad OH\end{array}\right]_2$$

yellow waxy substance (3)

$$[C_2H_5-\underset{\underset{CH_3}{|}}{\overset{\overset{CH_3}{|}}{C}}-CH_2-O-CH_2-\underset{\underset{OH}{|}}{CH}-CH_2-O-\langle\!\!\langle\ \ \rangle\!\!\rangle-CH=N-]_2$$

highly viscous yellow oil (4)

$$[n-C_8H_{17}-O-CH_2-\underset{\underset{OH}{|}}{CH}-CH_2-O-\langle\!\!\langle\ \ \rangle\!\!\rangle-CH=N-]_2$$

light yellow crystals M.P. 87° C.

(5)

$$[C_4H_9-\underset{\underset{C_2H_5}{|}}{CH}-CH_2-O-CH_2-\underset{\underset{OH}{|}}{CH}-CH_2-O-\langle\!\!\langle\ \ \rangle\!\!\rangle-CH=N-]_2$$

yellow waxy substance (6)

$$[C_4H_9-\underset{\underset{CH_3}{|}}{\overset{\overset{CH_3}{|}}{C}}-CH_2-O-CH_2-\underset{\underset{OH}{|}}{CH}-CH_2-O-\langle\!\!\langle\ \ \rangle\!\!\rangle-CH=N-]_2$$

highly viscous yellow oil (7)

$$[CH_3-\underset{\underset{CH_3}{|}}{\overset{\overset{CH_3}{|}}{C}}-CH_2-\underset{\underset{CH_3}{|}}{CH}-CH_2-CH_2-O-CH_2-\underset{\underset{OH}{|}}{CH}-CH_2-O-\langle\!\!\langle\ \ \rangle\!\!\rangle-CH=N-]_2$$

highly viscous yellow oil (8)

$$[n-C_{10}H_{21}-O-CH_2-\underset{\underset{OH}{|}}{CH}-CH_2-O-\langle\!\!\langle\ \ \rangle\!\!\rangle-CH=N-]_2$$

light yellow crystals M.P. 97° C.

(9)

$$[n-C_{12}H_{25}-O-CH_2-\underset{\underset{OH}{|}}{CH}-CH_2-O-\langle\!\!\langle\ \ \rangle\!\!\rangle-CH=N-]_2$$

light yellow crystals M.P. 99° C.

(10)

$$[C_6H_{13}-\underset{\underset{CH_3}{|}}{\overset{\overset{CH_3}{|}}{C}}-CH_2-O-CH_2-\underset{\underset{OH}{|}}{CH}-CH_2-O-\langle\!\!\langle\ \ \rangle\!\!\rangle-CH=N-]_2$$

highly viscous yellow oil (11)

$$[n-C_{18}H_{37}-O-CH_2-\underset{\underset{OH}{|}}{CH}-CH_2-O-\langle\!\!\langle\ \ \rangle\!\!\rangle-CH=N-]_2$$

colorless crystals, M.P. 101° C.

(12)

$$[n-C_{12}H_{25}-S-CH_2-\underset{\underset{OH}{|}}{CH}-CH_2-O-\langle\!\!\langle\ \ \rangle\!\!\rangle-CH=N-]_2$$

light yellow crystals, M.P. 172° C.

(13)

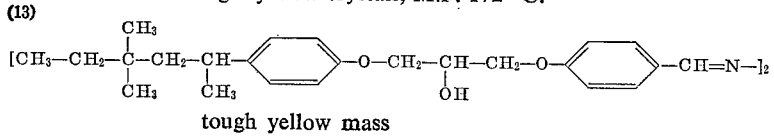

tough yellow mass (14)

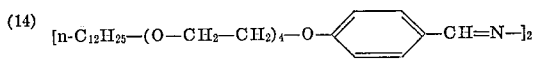

highly viscous yellow oil (B) Unsymmetrical azines

By reacting the previously described aldehydes, with hydrazones of aromatic aldehydes or ketones, unsymmetrical azines are obtained.

The method is illustrated by the following specific example:

95 g. of the following compound

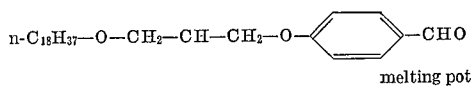

melting pot 71° C· and 25 g. of salicylaldehyde hydrazone are boiled for 1 hour under reflux in 400 ml. of alcohol, 2 cc. of glacial acetic acid and 0.5 ml. of sodium acetate solution, cooled, suction-filtered and recrystallized from methanol.

Yield of ultraviolet absorbing Compound 15: 52%.

(15)

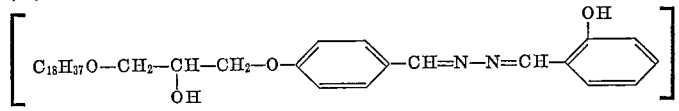

In the same manner, hydrazones of aromatic aldehydes or ketones with other substituents such as —H, —Cl, —OCH$_3$, etc. can be reacted.

The application to photographic elements is shown in the following examples:

EXAMPLE 1

760 ml. of 10% aqueous gelatin solution and 40 ml. of a 10% aqueous solution of dodecyl benzene sulfonate as emulsifier are vigorously stirred in an emulsifying apparatus and the solution consisting of 20 g. of Compound 7 dissolved in 50 ml. of ethyl acetate, is slowly added. The mixture is stirred for 15–20 minutes. After cooling, the solidified mass is formed into noodles and dried. The dried emulsion is completely clear. It is applied in the form of a 2–5% aqueous solution as a protective layer onto a light-sensitive multilayer color photographic material. Layer thickness: 1–5μ.

A solution suitable for casting can also be prepared by diluting the 10% emulsion to a 2–5% solution instead of drying it. Alternatively, in the emulsifying operation a 2–5% gelatin solution may be used.

The example can be modified in such a way that up to 50% of the weight of gelatin is replaced by the ultraviolet absorbing compound.

After usual color-forming processing of the photographic material, images are obtained in which the light fastness is improved by a factor of 2–10, depending on the layer thickness and concentration of the ultraviolet absorbing compound.

The improvement in the fastness is determined by an image with an ultraviolet protective layer and an image with a pure gelatin protective layer being exposed until the same degree of fading is reached. The ratio of the Lux hours required gives the improvement factor.

EXAMPLE 2

760 ml. of 10% aqueous gelatin solution and 60 ml. of a 10% aqueous solution of saponine as emulsifier are mixed in the manner referred to in Example 1 with 20 g. of Compound 10 dissolved in 50 ml. of ethyl acetate and further processed as in Example 1. The improvement in the light fastness is similar to that of Example 1.

EXAMPLE 3

760 ml. of 10% aqueous gelatin solution and 60 ml. of a 10% aqueous solution of saponine as emulsifier are mixed in the manner referred to in Example 1 with 20 g. of Compound 3 dissolved in 50 ml. of ethyl acetate, and further processed as in Example 1.

The ultraviolet absorber layers obtained in accordance with the above examples are completely clear, withstand the color processing without any change and do not show any exudation phenomena under high glaze drying. No precipitation occurs during the storage of the aqueous heated emulsions.

EXAMPLE 4

A color photographic image in a processed multilayer film or paper strip is coated with an ultraviolet absorbing layer as described in Example 1. Measuring of the coated element indicates a considerable density to ultraviolet light. The light fastness of the color photograph is improved by the factor 10 as compared with a color photograph of the same type without a protective layer. The thickness of the layer is about 3μ.

If applied in form of a protective layer, the thickness of that layer is preferably between 1 and 10μ, more preferably between 1 and 5μ. The layer may contain between 5 and 50% by weight of the ultraviolet absorbing compounds based on the weight of the dried layer.

We claim:

1. A photographic element comprising at least one supported photographic silver halide emulsion layer and a gelatin layer containing an effective amount up to the weight of the gelatin of an ultraviolet absorbing compound of the following formula:

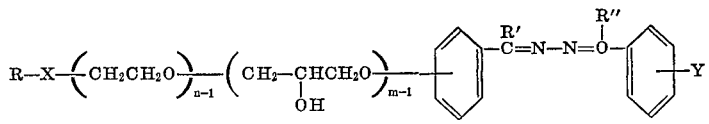

wherein:

R represents hydrogen, alkyl having up to 20 carbon atoms, olefinically unsaturated alkyl having up to 20 carbon atoms, phenyl, benzyl or phenyl ethyl;
R' stands for hydrogen or alkyl;
R" represents hydrogen, alkyl, phenyl or naphthyl;
X represents O or S;
Y represents hydrogen, halogen, hydroxy, etherified hydroxy, sulfo, carboxyl or a radical of the following formula:

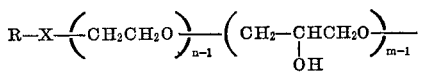

n is an integer from 1–10, and
m is an integer from 1–2, at least one of the integers being larger than 1 and the compound is viscous at ordinary temperatures.

2. A photographic element as defined in claim 1, wherein
X represents oxygen;
R an alkyl group having up to 20 carbon atoms;

R' and R" each represents hydrogen; and
Y is a group of the following formula:

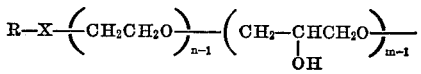

3. A supported ultraviolet absorbing gelatin filter layer containing an effective amount up to the weight of the gelatin of an ultraviolet absorbing compound of the following formula:

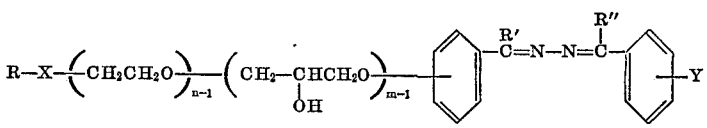

R represents hydrogen, alkyl having up to 20 carbon atoms, olefinically unsaturated alkyl having up to 20 carbon atoms, phenyl, benzyl or phenyl ethyl;
R' stands for hydrogen or alkyl;
R" represents hydrogen, alkyl, phenyl or naphthyl;
X represents O or S;
Y represents hydrogen, halogen, hydroxy, etherified hydroxy, sulfo, carboxyl or a radical of the following formula:

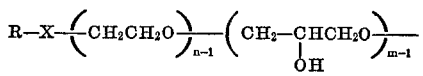

$n$ is an integer from 1–10, and
$m$ is an integer from 1–2, at least one of the integers is larger than 1 and the compound is viscous at ordinary temperatures.

4. A supported ultraviolet absorbing filter layer as defined in claim 3, wherein
X represents oxygen;
R an alkyl group having up to 20 carbon atoms;
R' and R" each represents hydrogen; and
Y is a group of the following formula:

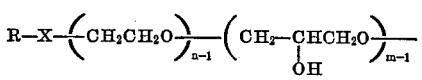

5. A color photographic element comprising a support having thereon a plurality of photographic emulsion layers containing coupled-dye images at least one of said dye images being subject to fading by the action of ultraviolet radiation, each emulsion layer containing a coupled-dye image subject to fading being arranged between said support and a protective gelatin layer containing an effective amount up to the weight of the gelatin of an ultraviolet absorbing compound of the following formula:

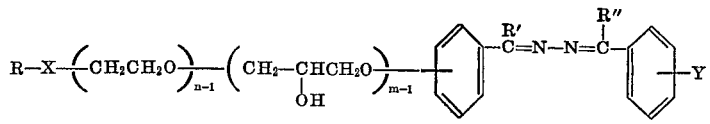

wherein:
R represents hydrogen, alkyl having up to 20 carbon atoms, olefinically unsaturated alkyl having up to 20 carbon atoms, phenyl, benzyl or phenyl ethyl;
R' stands for hydrogen or alkyl;
R" represents hydrogen, alkyl, phenyl or naphthyl;
X represents O or S;
Y represents hydrogen, halogen, hydroxy, etherified hydroxy, sulfo, carboxyl or a radical of the following formula:

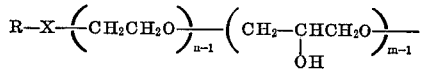

$n$ is an integer from 1–10, and
$m$ is an integer from 1–2, at least one of the integers is larger than 1 and the compound is viscous at ordinary temperatures.

6. A photographic element as defined in claim 5, wherein:
X represents oxygen;
R an alkyl group having up to 20 carbon atoms;
R' and R" each represents hydrogen and
Y is a group of the following formula:

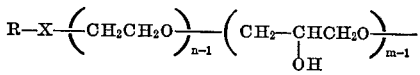

7. A photographic element as defined in claim 1, wherein the support is a paper support.

References Cited

UNITED STATES PATENTS
2,606,833  8/1952  Glickman _____ 96—84

FOREIGN PATENTS
591,275  8/1947  Great Britain.

OTHER REFERENCES
Schwartz, A. M. et al., "Surface Active Agents Their Chemistry and Technology," 1949, pp. 202–203.

NORMAN G. TORCHIN, *Primary Examiner.*

RONALD H. SMITH, *Assistant Examiner.*

U.S. Cl. X.R.

117—33.3; 252—300